Figure 1:
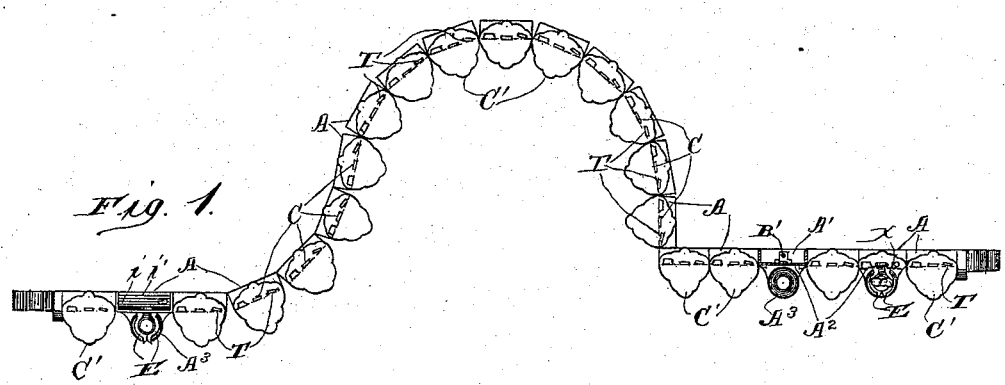

(No Model.) 7 Sheets—Sheet 1.

H. WESTPHAL.
COMBINED UMBRELLA STAND AND HAT AND COAT RACK.

No. 532,507. Patented Jan. 15, 1895.

Witnesses:
Chas. E. Gorton.
C. A. Duggan.

Inventor:
Henry Westphal
By Chas. C. Tillman
Atty (No Model.) 7 Sheets—Sheet 2.
H. WESTPHAL.
COMBINED UMBRELLA STAND AND HAT AND COAT RACK.
No. 532,507. Patented Jan. 15, 1895.
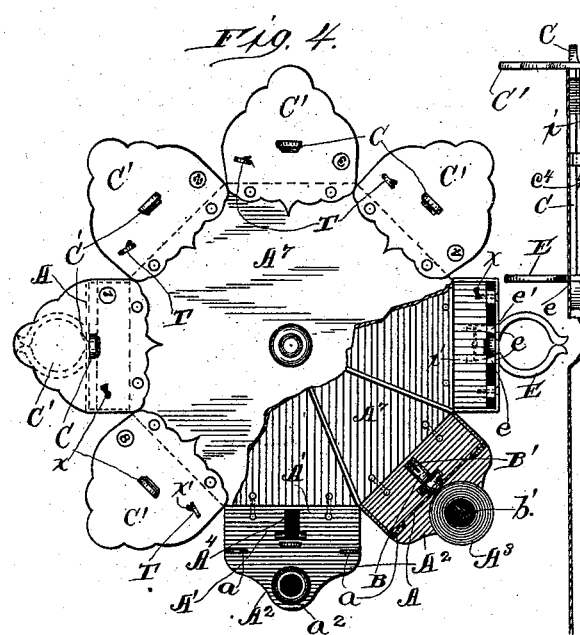
Fig. 4.
Fig. 5.
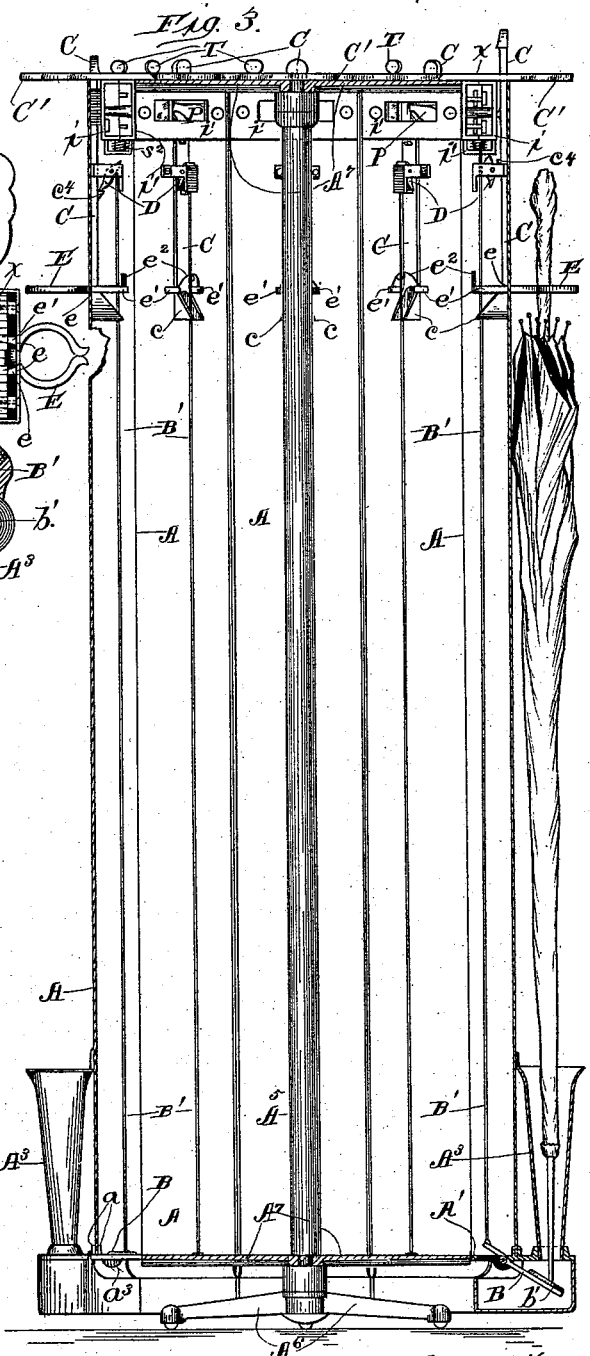
Fig. 3.
Witnesses:
Chas. E. Gorton.
C. A. Duggan.
Inventor:
Henry Westphal
By Chas. C. Tillman
Atty.

(No Model.) 7 Sheets—Sheet 3.
H. WESTPHAL.
COMBINED UMBRELLA STAND AND HAT AND COAT RACK.
No. 532,507. Patented Jan. 15, 1895.
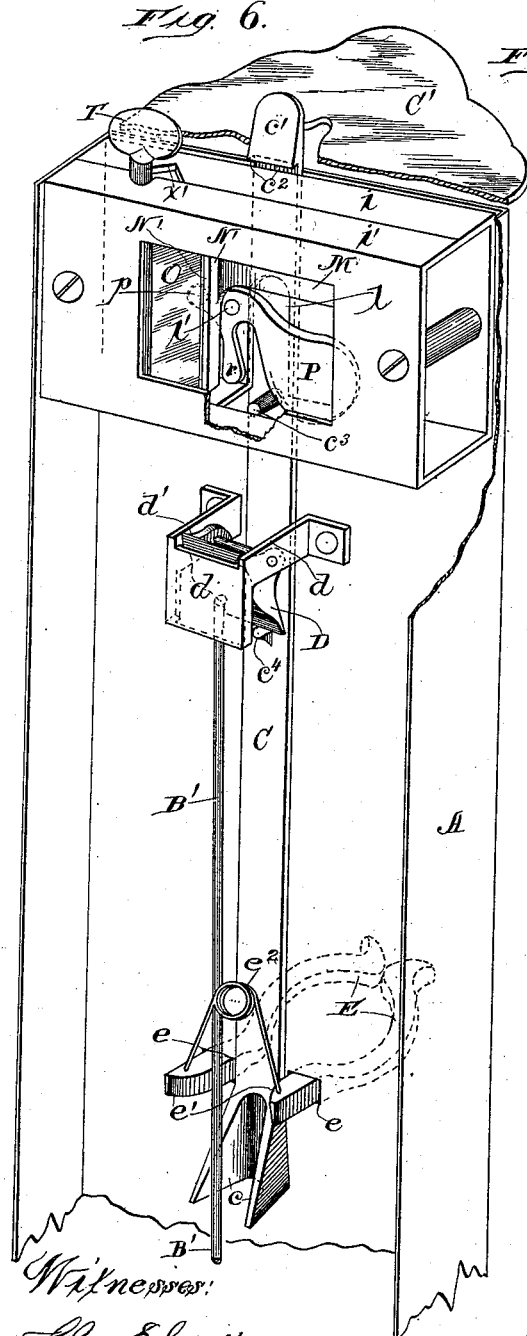
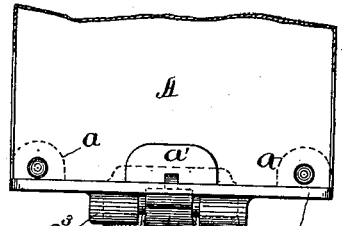
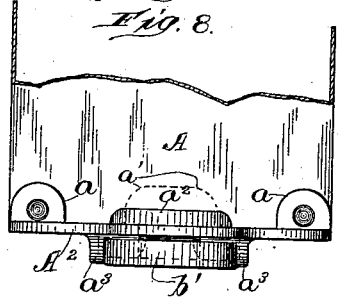
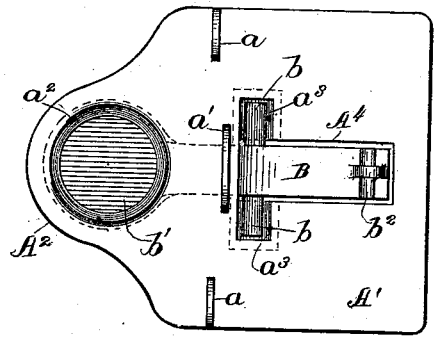
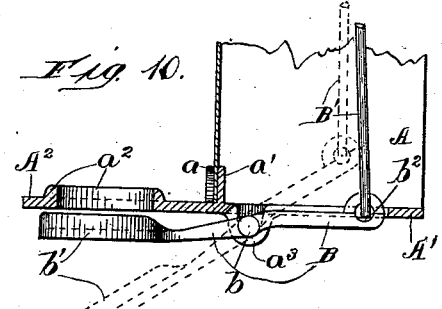
Witnesses:
Chas. E. Gorton.
E. A. Duggan.
Inventor:
Henry Westphal
By Chas. C. Tillman
Atty.
THE NORRIS PETERS CO., PHOTO-LITHO., WASHINGTON, D. C.

(No Model.) 7 Sheets—Sheet 4.
H. WESTPHAL.
COMBINED UMBRELLA STAND AND HAT AND COAT RACK.
No. 532,507. Patented Jan. 15, 1895.
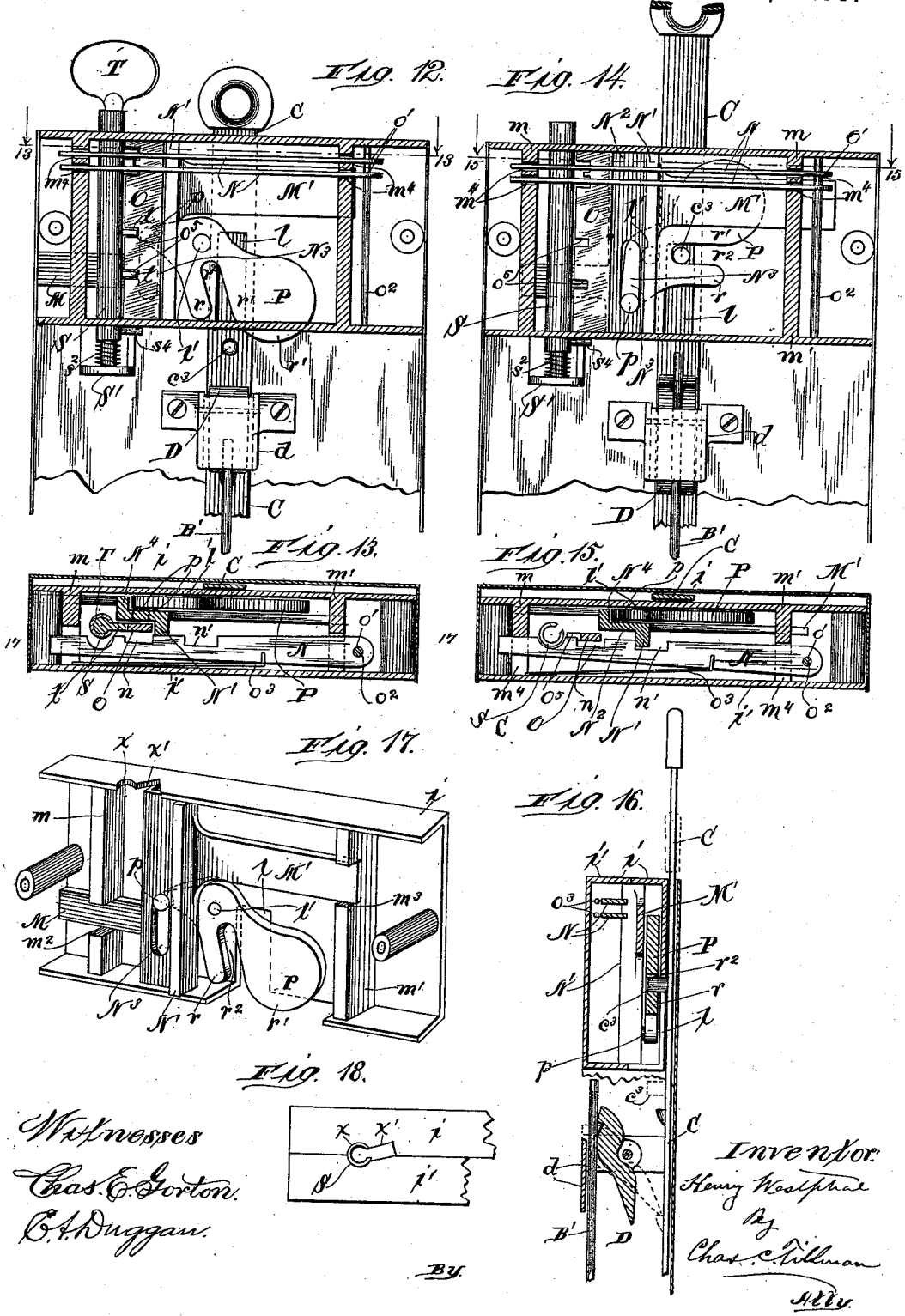
Witnesses
Chas. E. Gorton.
C. A. Duggan.
Inventor
Henry Westphal
By
Chas. C. Tillman
Atty.

(No Model.) 7 Sheets—Sheet 5.
H. WESTPHAL.
COMBINED UMBRELLA STAND AND HAT AND COAT RACK.
No. 532,507. Patented Jan. 15, 1895.
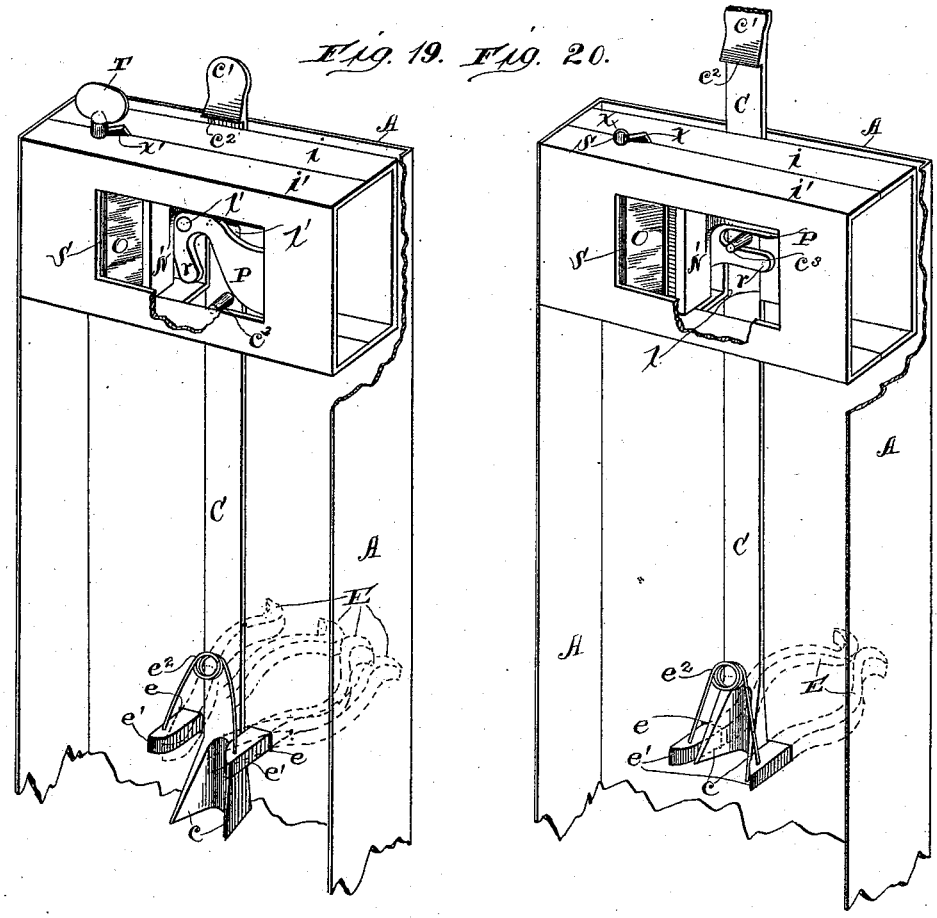
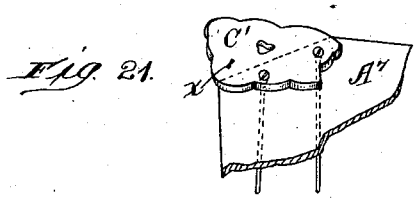
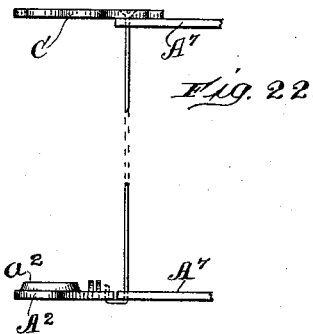
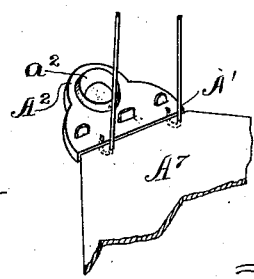
Witnesses:
Chas. E. Gorton
C. F. Duggan
Inventor:
Henry Westphal
By Chas. C. Tillman
Atty.

(No Model.) 7 Sheets—Sheet 6.
H. WESTPHAL
COMBINED UMBRELLA STAND AND HAT AND COAT RACK.
No. 532,507. Patented Jan. 15, 1895.
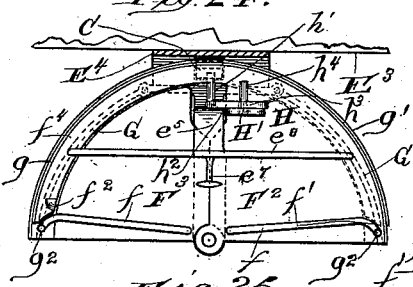
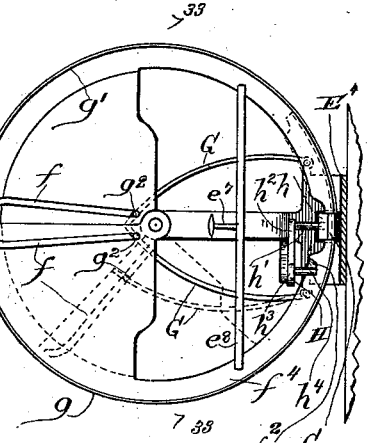
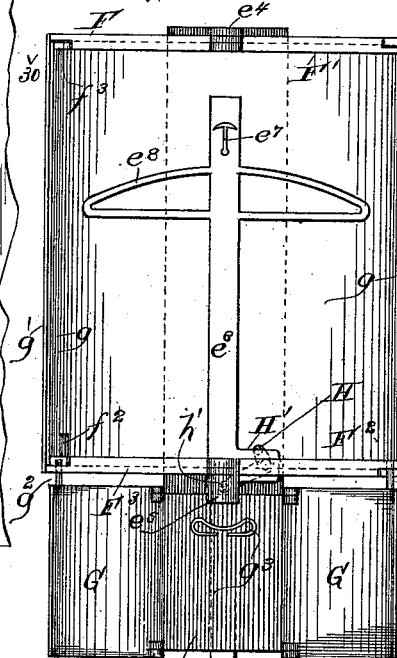
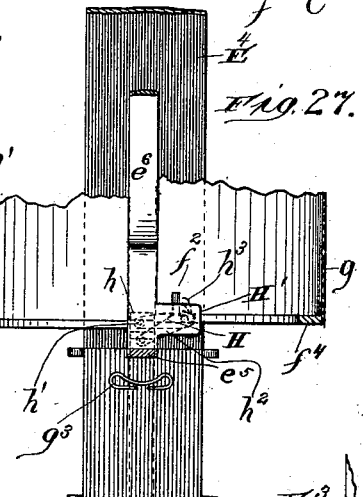
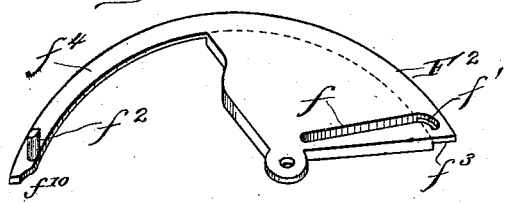
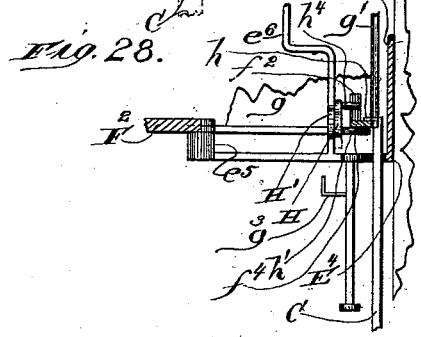
Witnesses:
Chas. E. Gorton.
O. A. Duggan.
Inventor:
Henry Westphal
By Chas. C. Tillman
Atty.

(No Model.) 7 Sheets—Sheet 7.
H. WESTPHAL.
COMBINED UMBRELLA STAND AND HAT AND COAT RACK.
No. 532,507. Patented Jan. 15, 1895.
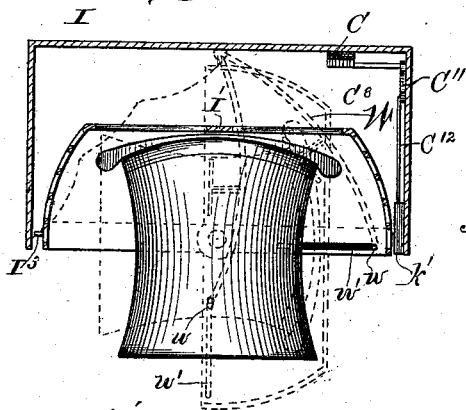
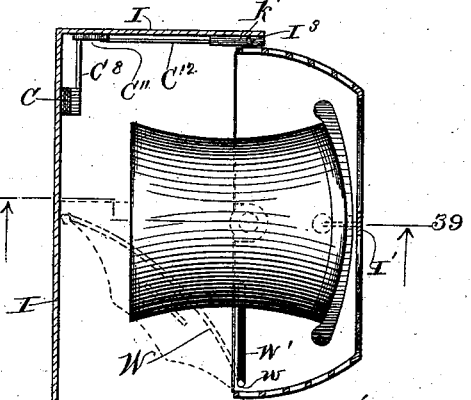
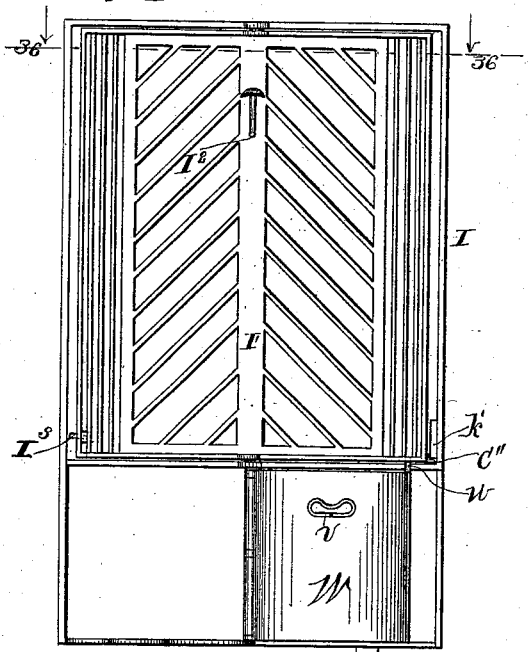
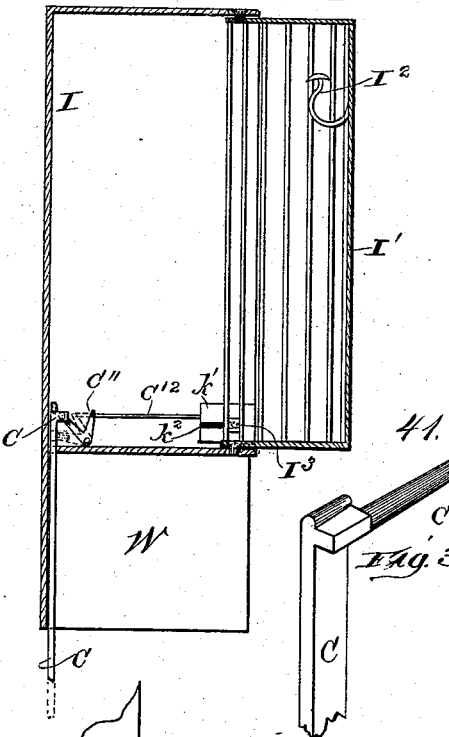
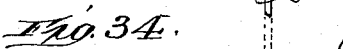
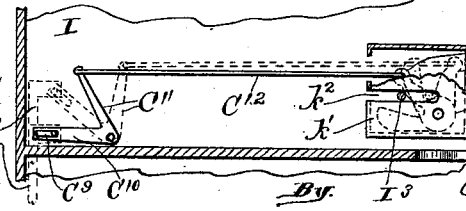
Witnesses:
Chas. E. Gorton
O. A. Duggan
Inventor:
Henry Westphal
By Chas. C. Tillman
Atty.

UNITED STATES PATENT OFFICE.

HENRY WESTPHAL, OF CHICAGO, ILLINOIS.

COMBINED UMBRELLA-STAND AND HAT AND COAT RACK.

SPECIFICATION forming part of Letters Patent No. 532,507, dated January 15, 1895.

Application filed March 7, 1894. Serial No. 502,668. (No model.)

*To all whom it may concern:*

Be it known that I, HENRY WESTPHAL, a citizen of the United States, residing at Chicago, in the county of Cook and State of Illinois, have invented certain new and useful Improvements in Combined Umbrella-Stands and Hat and Coat Racks, of which the following is a specification.

This invention relates to improvements in an apparatus to be used for the safe-keeping of umbrellas or walking-canes and hats and coats, and consists in certain peculiarities of the construction, novel arrangement, and operation of the various parts thereof, as will be hereinafter more fully set forth and specifically claimed.

The objects of my invention are, first, to provide a simple and inexpensive stand or holder for umbrellas, hats and coats, from which they can not be removed, except by the desire of the rightful owner; second, such a device, which may be applied to the wall of a room or to surfaces of various shapes, without occupying a great amount of space, and, third, a device, in which one or more of the articles can be secured therein independently of the other.

In order to enable others skilled in the art to which my invention pertains to make and use the same, I will now proceed to describe it, referring to the accompanying drawings, in which—

Figure 2:
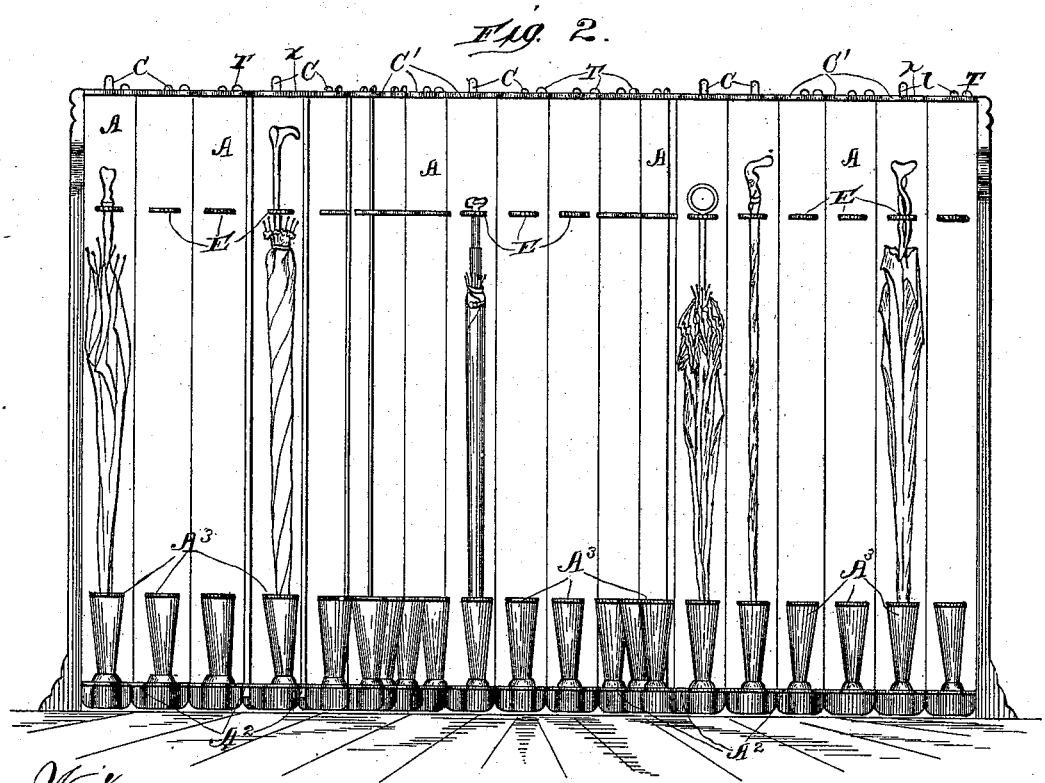

Figure 1, is a plan view of a series of umbrella-stands, without the hat and coat rack, showing their adaptability to walls or surfaces of various shapes. Fig. 2, is a view in front elevation thereof. Fig. 3, is a central sectional view of a revolving-stand for umbrellas, only, constructed in octagonal shape. Fig. 4, is a plan view thereof, partly in section. Fig. 5, is a plan view of the top and bottom plates of the revolving-stand. Fig. 6, is a rear perspective view, partly in section, showing the upper portion of the box or frame of one of the umbrella stands, its lock, draw-bar, clasp, and operating-rod. Fig. 7, is a rear view in elevation of the lower portion of one of the boxes and its tripping-lever. Fig. 8, is a view in front elevation thereof. Fig. 9, is a plan view of the bottom plate and its tripping-lever, of one of the boxes. Fig. 10, is a vertical sectional view of the bottom plate, a portion of one of the boxes, and a part of the operating-rod, showing it connected to the tripping-lever. Fig. 11, is a detail perspective view of a portion of the tripping-lever. Fig. 12, is a sectional view of the upper part of one of the boxes, its lock, draw-bar, and operating-rod. Fig. 13, is a plan sectional view thereof, taken on line 13, 13, of Fig. 12. Fig. 14, is a sectional view of a portion of the box, its lock, and part of the operating-rod, showing the draw-bar raised. Fig. 15, is a plan sectional view thereof, taken on line 15, 15, of Fig. 14. Fig. 16, is a central sectional view of Fig. 14. Fig. 17, is a perspective view of the lock removed from the box, taken on line 17, 17, of Fig. 13. Fig. 18, is a detail plan view of a part of the lock-casing, showing the construction of the key-hole. Fig. 19 is a perspective view of the upper part of one of the boxes, with the lock in place, showing the draw-bar lowered in order to permit of the umbrella being inserted in the clasps. Fig. 20, is a similar view, showing the draw-bar raised, so as to close the clasps, and as the bar will appear, when the umbrella is locked in. Fig. 21, is a perspective view of a portion of the top and bottom plates, showing the guard-plate and cup-holder secured thereto, respectively, and the method of securing the said plates together. Fig. 22, is a view in side elevation thereof. Fig. 23, is a view in front elevation of the umbrella-stand, hat and coat-rack combined, showing it secured to a wall and with the hat, coat, and umbrella secured in position. Fig. 24, is a plan sectional view, taken on line 30, 30, of Fig. 25, showing the hat inclosure or hood and coat-receptacle, open. Fig. 25, is a view in front elevation of the hat and coat inclosures or receptacles open. Fig. 26, is a plan sectional view, taken on line 30, 30, of Fig. 25, showing the hat and coat-inclosures or receptacles closed. Fig. 27, is a view in front elevation of a part of the hat-receptacle, showing it closed and locked, taken on line 33, 33, of Fig. 26. Fig. 28, is a detail view, partly in section, of the locking mechanism of the coat and hat-receptacle. Fig. 29, is a detail perspective view of one of the semi-circular closing disks of the hat-receptacle. Fig. 30, is a plan sectional view of another modification of the hat and coat receptacle, taken on line 36, 36, of Fig. 32, and showing it open by continuous lines, and partly closed or turned, by dotted lines. Fig. 31, is a similar view, showing it closed. Fig. 32, is a view in front elevation, showing the hat and coat-receptacles, open. Fig. 33, is a vertical sectional view, taken on line 39, 39, of Fig. 31. Fig. 34, is a sectional view of the lower part of the frame of the hat-receptacle, showing the operating mechanism thereof. Fig. 35, is a detail view of the upper part of the operating-rod, and Fig. 36, is a detail view of the locking-lever.

In order to show the applicability of my invention to the various shapes or forms of surfaces and constructions to which it is adapted, I have illustrated in Figs. 1, 2, and 3, of the drawings, a series of umbrella-stands, only, without the hat and coat-rack, but it will be made apparent in the following description, that the hat and coat-rack also can be applied to such forms or constructions. It is also for this reason that I have displayed a series of stands, instead of illustrating the construction of one, only. I will therefore in the following description confine myself to the operation and construction of one device.

A, represents a box, which is preferably made rectangular in form, in cross-section, and of suitable dimensions to inclose the operating mechanism and of length somewhat longer than an umbrella-staff. To the bottom of this box is secured a plate $A'$, which is provided on its upper surface at proper points for engagement with the front of the box, with lugs $a$, and $a'$, to which the said portion of the box is riveted, the lug $a'$, being somewhat out of alignment with the lugs $a$, so that the front of the box will pass between the same. The plate $A'$, is provided with an extended portion $A^2$, in which is formed an opening $a^2$, for the reception of a cup $A^3$, for the lower portion of the umbrella. The central part of the plate $A'$, is provided with a "T"-shaped opening $A^4$, which opening is depressed to form the bearings $a^3$, for the tripping-lever B, which lever is provided near its middle with transverse projections $b$, to rest in the bearings $a^3$, and to form a fulcrum point therefor. The front end of this lever is formed with a circular cap $b'$, of about the size of the opening $a^2$, in the plate $A'$, under which it is directly located. The opposite end of the lever B, is provided with a transverse opening $b^2$, to which is secured the operating-rod $B'$, which extends upward within the box or casing A, and operates a pawl, which locks and releases the draw-bar C, as will be presently explained.

At a suitable point in the front of the box or casing are provided two openings $e$, located near each other, and in a horizontal line, through which is passed and pivotally secured the arms of the clamp or clasp E, which as shown, is formed with its outer portion curved, so as to form a ring for the reception of the umbrella-staff or handle. The inner portions of the arms of the clasp are outwardly beveled, as at $e'$, and are held normally in position by means of the spring $e^2$, which is connected to each of the inner ends of the arms, between which is passed and operates the draw-bar C, which is preferably made of a flat piece, formed at its lower portion substantially "V"-shaped in cross-section, so as to form a dividing-wedge $c$, to separate the inner ends of the clasp. The upper portion of the draw-bar C, is passed through the top of the box, and the guard-plate $C'$, and is provided with a thumb-piece $c'$, by means of which it may be raised, and which is enlarged so as to form a rest $c^2$, to prevent the bar passing down too far in the box. The rear surface of the bar C, near its upper portion is provided with pins or projections $c^3$, and $c^4$, the former of which is to engage with the lock in the upper part of the box, and the latter with the pawl D, which is pivotally secured in the bracket $d$, attached to the inner surface of the front part of the casing, and which pawl is operated by means of the rod $B'$, the upper end of which, when in its normal position impinges against the free end $d'$, of the pawl, so that the weight of the umbrella resting on the tripping-lever B, will cause it to assume the position shown in dotted lines in Fig. 10, thus raising the rod $B'$, which will cause the pawl D, to be disengaged from the pin or projection $c^4$, and will permit the draw-bar being lifted, when the pin or projection $c^3$, thereon will engage the lock, and thereby be secured in a raised position, thus securely locking the clasp, which embraces the umbrella-staff or cane.

In the upper part of the box or casing A, is located a lock, which I have fully described and illustrated, but have not claimed in Letters Patent No. 506,756, dated October 17, 1893, and for which improvement in locks, I have made application for Letters Patent, which application was filed on the 1st day of March, 1894, and is serially numbered 501,924. The lock consists of a casing composed of two plates $i$, $i'$, the plate $i$, being formed with a slot $l$, near its middle, as shown and having close to its ends the ribs $m$, $m'$, both of which are formed with openings or recesses $m^2$, $m^3$, in which sliding-bolts M, M', operate and are thereby guided in their backward and forward movements. The opening or recess $m^2$, is formed near the lower portion of the rib $m$, and the opening or recess $m^3$, near the upper end of the rib $m'$. Near their upper portions and on their surfaces adjacent to the plate $i'$, each of the ribs $m$, $m'$, is formed with recesses or mortises $m^4$, for the reception and operation of the spring-actuated-tumblers N, which are formed with recesses $n$, $n'$, the former of which engages with the stay O, and the latter with the rib or bead $N'$, on the piece $N^2$, which unites the sliding-bolts M, and M', and is preferably formed in cross-section as shown in Figs. 13, and 15, with two projections $N'$, $N^4$, at its edges, extending in opposite directions, the flat piece $N^2$, being provided near its lower portion with a vertical slot $N^3$, in which fits and operates a pin or lug $p$, on the bifurcated cam P, which cam is pivotally secured to the plate $i$, at a suitable point near the outer portion of the slot $l$, therein, as shown at $l'$.

The cam is made as is clearly shown in Figs. 12, 14, and 17, with two prongs $r\ r'$, which form an open slot or fork $r^2$, into which will engage the lug or pin $c^3$, on the draw-bar C. As shown in Figs. 12, 13, and 14, the tumblers N', are pivotally secured as at $o'$, on the rod $o^2$, having its bearings in the top and bottom of the casing, near the farther end from the key-guide, and are provided with springs $o^3$, which are interposed between the tumblers and the plate $i'$, and they will be thus forced forward to engage with the bead or rib N', on the sliding piece $N^2$. Near the rib $m$, the casing is provided in its top and bottom with suitable circular openings X, through which is passed a split tube or key-guide S, which has its bearings for its lower end in the depending bracket S', on the bottom of the lock-casing. The lower end of the key-guide is provided with a spring $s^2$, which serves to revolve the guide till the split therein, through which the projections $t$, on the key T, pass to engage with the tumblers is brought into alignment with the opening X', therefor in the top of the casing, and is prevented from turning the guide too far, by means of the lug or pin $s^4$, secured thereto, which is so placed that it will strike the bracket S', which acts as a check. The stay O, which is provided with a number of recesses $o^5$, to correspond with a number of projections $t$, on the key T, is rigidly secured in a vertical position and longitudinally with the lock-casing between the bead N', and the key-guide and between the tumblers and the piece $N^2$. This stay is employed to regulate the combination of the lock, for it is obvious that the projections $t$, on the key must correspond in number and dimensions with the recesses in the stay, otherwise they would not pass through the same. When the umbrella is placed in the cup therefor, and rests on the trap-lever B, the pawl D, will be disengaged from the projection $c^4$, on the bar C, which may then be raised, when the projection or pin $c^3$, will extend into the slot $l$, of the plate $i$, of the lock and will engage with the open slot $r^2$, or fork, between the prongs $r$, $r'$, on the cam P, when the upward movement of the bar C, provided as before stated with the projection $c^3$, engaging the prongs $r$, and $r'$, will cause the cam P, to be raised to the position indicated in Fig. 14, the movement of which cam by means of its pin $p$, operating in the slot $N^3$, of the plate $N^2$, will cause the sliding-bolts M, M', and the bead N', which are connected to the plate $N^2$, or made integral therewith to be retracted to the position shown in Fig. 14, which operation removes the plate $N^2$, from interference with the projections on the shank of the key, and thus permits the key-guide S, to be partially revolved by means of the spring $s^2$, till the projections of the key are in alignment with the opening $x'$, in the top of the casing, when, and not before, the key may be withdrawn and the draw-bar C, and clasp E, will be securely locked, by reason of the engagement of the tumblers N, with the bead N'. In order to release or unlock the bar C, it will be necessary to place the key in the key-guide, when by turning the same, its projections will engage the tumblers, and will free them from engagement with the bead N', when by reason of the weight of the bar C, and cam P, they will be lowered, as shown in Fig. 12, which operation will interpose the plate $N^2$, between the projections on the key-shank and the opening $x'$, in the top of the casing and prevent the key being removed.

The top of the box or casing A, is covered by a guard-plate C', which prevents the umbrella or cane being moved out of the clasp E, for the reason that the top of the staff or handle will strike said plate, which prevents withdrawal from the casing, before the lower end of the umbrella or cane is freed from the cup $A^3$, which is made of sufficient length to prevent the withdrawal.

In Figs. 3, and 4, I have shown an umbrella-stand composed of several compartments and mounted on an upright standard $A^5$, which is provided at its bottom with a base $A^6$, provided with casters for the easy removal from one place to another of the stand. At the top and bottom of the standard $A^5$, and having their bearings therein, are located disks or plates $A^7$, to which the boxes or casings A, are secured. These disks are adapted to revolve on the standard, as is clearly shown in Fig. 3, of the drawings.

From the foregoing description and by reference to the figures of the drawings therein referred to, it will be seen and understood that the placing of the umbrella within the cup and clasp, operates so that the key can be removed, only, when the umbrella is in said devices, and that the umbrella cannot be removed without the use of the key. By replacing the key in the lock and turning it, the projections thereof will impinge with the tumblers, and disengage them from the bead N', when by reason of their gravity, the draw-bar C, and cam P, will descend on lifting the umbrella from the trap, and will thus interpose the plate $N^2$, between the projections of the key and the openings $x'$, therefor in the casing, and prevent its removal, except by again inserting the umbrella or cane. In the descent of the draw-bar, the wedge $c$, thereon, will be thrown out of engagement with the arms $e$, of the clasp E, and allow it to be separated.

In Figs. 19, and 20, I have shown the upper portion of a box or casing, in which the construction and operation of the various parts are the same, as before described, with the exception, that the trap-lever B, and operating-rod B', shown in Fig. 3, of the drawings are omitted. In this modification the key and umbrella or cane act independently of each other; that is, the draw-bar C, may be raised and the key removed with or without inserting the umbrella, as is apparent. In the constructions above described, the casing A, is for the inclosure of the operating-mechanism, only, the umbrella being left exposed, as shown in Figs. 2, and 3, of the drawings.

In Figs. 23 to 29, inclusive, I have illustrated the manner of combining my umbrella-stand with a hat and coat-rack, and the method of securing hats and coats therein. The umbrella-stand or that part of the device adapted for the reception of the umbrella may be of either of the constructions above described, which have been so fully explained as not to require further description. At a suitable point on the wall $E^3$, or other suitable support and at a convenient height to be easily reached, is secured the frame $E^4$, of the hat-receptacle and coat securing device. The frame $E^4$, or upright piece is provided at its top with an arm $e^4$, extending horizontally therefrom, and a suitable distance below the same is a similar arm $e^5$, within which arms the plates F, F', $F^2$, and $F^3$, which form the top and bottom of the hat-receptacle or hood have their bearings. These plates are in outline semi-circular in form, so that when they are turned in opposite directions, they will form a complete circle or one that is slightly broken at its rear. The plate $F^2$, is formed, as shown with a radial slot $f$, which is slightly curved at its outer end, as at $f'$. As is shown in Fig. 29, about one-half of the plate $F^2$, is cut away, thus leaving a part of a ring $f^4$, near the end and on the upper surface of which is formed a pin or projection $f^2$, for the purpose hereinafter set forth. The part $f^4$, may be provided at its free end with a recess or curved cut away portion $f^{10}$, for the reception of the draw-bar C, when it is raised. That portion of the plate $F^2$, in which the slot $f$, is formed is provided with a peripheral recess $f^3$, on its lower surface for the reception of a portion of the lower plate $F^3$, which is a counter-part of the plate $F^2$, with the exception that the pin $f^2$, is omitted from the lower plate. The plates F, and F', are of the same shape and form, as the plate $F^2$, shown in Fig. 29, except that the pin $f^2$, and slots $f$, are omitted. The plates F', and $F^2$, are united together by means of a semi-circular piece $g$, which is secured to their peripheries. The plates F, and $F^3$, are likewise united together by means of a semi-circular piece $g'$, which fits around the piece $g$, the plates F', and $F^2$, being somewhat smaller than the plates F, and $F^3$, for this purpose. Extending upward from the arm $e^5$, is a standard $e^6$, upon which is a hook $e^7$, for the hat. The standard $e^6$, is provided with cross-arms $e^8$, to hold the hat in position. Just below the hood or hat-receptacle and on each side of the upright piece $E^4$, are hinged two doors G, which are provided at their upper ends with pins $g^2$, which engage with and operate in the slots $f$, of the plates $F^2$, and $F^3$. Between these doors and to the upright $E^4$, is a hook $g^3$, upon which the coat may be hung. The bar C, which extends to the lower part of the hood or hat-receptacle, as shown in Fig. 28, is formed with a forward projection $h$, which normally rests on the rearward projection or pin $h'$, on the arm $h^2$, of the compound lever H, which is fulcrumed to the rear side of an arm H', extending at a right angle from the upright $e^6$. The other arm $h^3$, of the lever H, is provided with a rearward projection $h^4$, with which the projection or pin $f^2$, on the plate $F^2$, impinges, when the hood is closed, and forces the arm bearing the pin $h^4$, upward, thus interposing the upper end of the draw-bar C, between the ends of the pieces $f^4$, or in the recesses $f^{10}$, therein of the lower plates or disks $F^2$, and $F^3$, and holding them in a closed position, until the draw-bar is again lowered. It is apparent that when the semi-circular pieces $g$, and $g'$, are drawn together, so as to complete the circle or hat-inclosure, that the doors G, by reason of their projections $g^2$, operating in the slots $f$, of the lower plates will also be closed around the coat, which is hung on the hook $g^3$, from which it cannot be removed until the doors are opened.

In Figs. 30, to 36, inclusive, I have shown a modification in the construction of the hood or coat and hat-receptacle, and the operating mechanism therefor, which consists in employing a rectangular frame I, which is secured to the wall or other support. The front part of the frame is open and is closed at the top and bottom, as shown in Fig. 33, within which parts the hood I', which is substantially semi-circular in cross-section has its bearings. This hood, as shown, is preferably made of grated bars, and is provided on its inner side with a hook $I^2$, for the hat. Near its bottom and on one side is provided a pin or projection $I^3$, which engages with a compound-lever K, and is thereby locked in position, when the hat is inclosed. The draw-bar C, as in the other construction extends upward into the lower portion of the frame I, and is provided with a laterally extending arm $C^8$, which engages in a slot $C^9$, in the compound-lever $C^{10}$, which lever is fulcrumed to the side of the casing, and has secured to its other arm $C^{11}$, a rod $C^{12}$, which is connected to an arm $k$, of the compound-lever K, which is also fulcrumed to the side of the casing I, and is provided with a plate $k'$, having a horizontal slot $k^2$, in which the pin or projection $I^3$, passes and is locked. Just below the hood and to the central part of a downward extension of the frame is hinged at its side a curved door W, the upper portion of which is provided near its free edge or side with a pin or projection $w$, which operates in a radial slot $w'$, in the lower plate of the hood. At a proper point on the door below the hood is located a hook $v$, upon which to hang the coat. When ready to receive the coat and hat, the receptacles therefor will assume the positions shown in continuous lines in Figs. 30 and 32, when by revolving the hood I', the pin I³, will pass into the slot $k^2$, and engage the arm $k$, of the lever K, which will thereby be lifted to the position indicated by dotted lines in Fig. 34, which operation will also draw the compound-lever $C^{10}$, to the dotted position shown in the last named figure, and will thereby raise the draw-bar C, which will engage with the lock in the umbrella-stand, and be secured in a raised position, when the key for the umbrella-stand may be removed. It is obvious that by turning the hood I', that the door W, by reason of its projection $w$, engaging with the slot in the bottom of the hood, will also be turned, so as to inclose the upper part of the coat, which is hung on the hook provided therefor, and will press the same against the downward extension of the frame or casing I, so that it cannot be removed unless the door is open.

From the foregoing description it will be understood, that the draw-bar C, when used in combination with either of the constructions for the hat and coat receptacles above described is raised the same distance as if it was used with the umbrella stand, only, and by reference to Figs. 23, to 29, inclusive, it is clear that the bar cannot be raised except by revolving the plates of the hat-receptacle, whereas in the construction employed in Figs. 30, to 36, inclusive, it can be raised and lowered without moving the hood, but when the hood is turned, the same will be locked in a closed position.

Having thus fully described my invention, what I claim as new, and desire to secure by Letters Patent, is—

1. The combination of a support or casing with a receptacle at its lower part for the lower end of the umbrella, a clasp pivotally secured in the casing to engage the upper part of the umbrella, a locking mechanism located in the upper part of the casing and a bar uniting the clasp and lock, provided with a projection to engage the latter and a dividing wedge to engage the inner ends of the arms of the clasp and to hold it in a closed position, substantially as described.

2. The combination of a support or casing having at its top means for preventing the vertical removal of the umbrella, with a receptacle at its lower part for the lower end of the umbrella, a spring-actuated-clasp pivotally secured in the casing to engage the upper end of the umbrella, a locking mechanism located in the upper part of the casing, and a bar uniting the clasp and lock, provided with a projection to engage the latter and a dividing wedge to engage the inner ends of the arms of the clasp and to hold it in a closed position, substantially as described.

3. The combination with a support or casing of a securing receptacle for the umbrella, a locking mechanism located in the upper part of the casing, a draw-bar having a projection to engage the lock and another projection to engage a pawl, a trap-lever in the lower part of the casing, having a rod to impinge the pawl and to liberate the draw-bar and said pawl adapted to engage the bar when in a lowered position, substantially as described.

4. The combination with a support or casing of a securing receptacle for the umbrella, a locking mechanism located in the upper part of the casing, a draw-bar having projections to engage the lock and a pawl, and other means for locking the securing device, a pawl to engage the draw-bar, a trap-lever in the lower part of the casing having a rod to impinge the pawl and to liberate the draw-bar, substantially as described.

5. The combination with a support or casing of a receptacle for the lower part of the umbrella, a clasp to engage the upper part thereof, a locking mechanism in the upper part of the casing, and a connection uniting the clasp and lock, provided with means for engaging the latter and for securing the clasp in a closed position, and having a projection to engage a pawl, said pawl adapted to engage the connection when in a lowered position, a trap-lever fulcrumed at the lower portion of the umbrella receptacle, and having a rod to impinge the pawl and to liberate the connection or bar, substantially as described.

6. The combination with a casing or support having a guard plate at its top of a receptacle for the lower part of the umbrella, a spring-actuated-clasp for the upper part thereof, a locking mechanism located in the upper part of the casing, a draw-bar having a projection to engage the lock and a dividing-wedge to engage the inner arms of the clasp and to hold it in a closed position, a pawl to engage a projection on the draw-bar, a trap-lever in the lower portion of the umbrella-receptacle, and having a rod to impinge the pawl and to liberate the draw-bar, substantially as described.

7. The combination of the casing or support A, having at its top the guard-plate C', and at its bottom the plate A', provided with the openings $a^2$ and $A^4$, the bearings $a^3$, and lugs $a$, $a'$, with the cup $A^3$, secured in the opening $a^2$, the arms $e$, of the clasp E, pivotally secured in the casing, the bracket $d$, the pawl D, pivotally secured therein, a locking mechanism in the upper part of the casing, the draw-bar C, having the projections $c^3$, $c^4$, and dividing-wedge $c$, the trap-lever B, having the projections $b$, cap $b'$, and rod B', all constructed, arranged and operating substantially as described.

8. The combination with a casing or support of a receptacle for the umbrella, a locking mechanism, the hat and coat receptacles, a trap-lever fulcrumed in the lower part of the casing and having an operating rod to operate a pawl, said pawl pivotally secured within the casing, a draw-bar provided with projections to engage the lock and pawl, and having means for securing the umbrella against removal, and at its upper part with means whereby it is raised in the closing of the hat and coat receptacles and for locking them in a closed position, substantially as described.

9. The combination with a casing or support of a receptacle for the lower part of the umbrella, a clasp to engage the upper part of the same, a locking mechanism located in the upper part of the casing, the hat and coat receptacles placed above the umbrella-stand, a trap-lever fulcrumed at the lower part of the umbrella receptacle, and having a vertically extending rod, a pawl secured within the casing, a draw-bar provided at its lower portion with means to engage the lock, pawl and clasp, and to hold the latter in a closed position and at its upper part with means whereby it is raised in the closing of the hat and coat receptacles and for locking them in a closed position, substantially as described.

10. A hood or hat receptacle consisting of the pairs of plates F, $F^3$, and F', $F^2$, united together by the pieces $g'$, and $g$, respectively, each of said plates having the piece $f^4$, and recess $f^3$, and the lower ones the slot $f$, and the plate $F^2$, provided with the projection $f^2$, and the doors G, having the projections $g^2$, to engage the slots $f$, and the draw bar C, having means to engage the projection $f^2$ substantially as described.

11. The combination with the pairs of plates F, $F^3$, and F', $F^2$, united together by the pieces $g'$, and $g$, respectively, each of said pieces having the piece $f^4$, and recess $f^3$, and the lower ones having the slot $f$, and the plate $F^2$, provided with the projection $f^2$, of the door G, having the projections $g^2$, to engage the slots $f$, the compound lever H, having the arms $h^2$, $h^3$, and pins $h'$, $h^4$, and the draw-bar C, having the projection $h$, all constructed, arranged, and operating substantially as and for the purpose set forth.

HENRY WESTPHAL.

Witnesses:
CHAS. C. TILLMAN,
E. A. DUGGAN.